Sept. 10, 1968 P. FRENCH 3,401,286

DYNAMOELECTRIC RELUCTANCE MACHINES

Filed April 27, 1966 2 Sheets-Sheet 1

INVENTORS
Park French

BY *Hill, Sherman, Meroni, Gross & Simpson* ATTORNEYS

Sept. 10, 1968 P. FRENCH 3,401,286
DYNAMOELECTRIC RELUCTANCE MACHINES
Filed April 27, 1966 2 Sheets-Sheet 2

INVENTOR.
Park French

BY Hill, Sherman, Meroni, Gross & Simpson ATTORNEYS

United States Patent Office 3,401,286
Patented Sept. 10, 1968

3,401,286
DYNAMOELECTRIC RELUCTANCE MACHINES
Park French, Aurora, Ohio, assignor to TRW Inc.,
Cleveland, Ohio, a corporation of Ohio
Filed Apr. 27, 1966, Ser. No. 545,648
8 Claims. (Cl. 310—168)

The present invention relates to a new type of dynamoelectric machine, and more particularly, to a dynamoelectric reluctance machine having disk-type rotors and stators.

The machines of the present invention are of the disk rotor and stator type in which a shaft carries a plurality of spaced rotor elements which are in interleaved or interdigitated relationship with a plurality of stator disks. The invention is directed specifically to the construction of the rotor and stator disks. While this type of machine, per se, is known, the present invention provides a new and unique disk for this type of dynamoelectric machine.

An object of the invention is to provide a more efficient and lightweight disk for a dynamoelectric reluctance machine.

Another object of the present invention is to provide an improved stator and rotor disk construction for a dynamoelectric machine, making it possible to achieve a higher power to weight ratio in such a machine.

In one form of the present invention, I provide a dynamoelectric machine with a plurality of disk elements, wherein certain of the disk elements have a plurality of magnetic sectors and a plurality of non-magnetic sectors. The magnetic sectors are each composed of a plurality of insulated conductors which provide a plurality of magnetic paths of high permeability for conducting a dynamic field. This construction of the magnetic sectors of the disk does not allow appreciable spreading of the flux inside the magnetic sectors, because the finite thickness of the insulation between the conductors results in a low transverse permeability for the material. As a consequence, high localized flux densities are created within the sectors which results in greater horsepower per unit weight.

The principles of operation can be understood from the following simplified example, considering a machine possessing a magnetic circuit which changes cyclically in reluctance with the rotation of a shaft coupling the device to a mechanical load or power source. The behavior of this machine may be conveniently discussed on the basis of magnetic co-energy.

In terms of the vector field $\overline{H}$ and the vector flux density $\overline{B}$, the co-energy of such a system is as follows:

$$E_c = \frac{1}{4\pi} \int_V \overline{B} \cdot dH \quad (1)$$

where V is the system volume over which the integration is carried. For a magnetic circuit which undergoes a change in configuration under constant magnetomotive force, the change in co-energy represents the difference between the energy supplied by the source of magnetomotive force and the change is stored magnetic energy. The change in co-energy therefor is identical with the mechanical energy produced, and can be used in calculating mechanical quantities. This method is more direct than taking differences between supplied and stored energies, and often lends more insight into the behavior of the system under consideration.

The co-energy theory can be used in the calculation of forces and torques. In generalized terms, these quantities are calculated from the form as follows:

$$F_i = \frac{\partial E_c}{\partial x_i} \quad (2)$$

where $F_i$ is a generalized force and $x_i$ is the generalized displacement conjugate to that force. It will be noted that Equation 2 has a form similar to the usual force equation of mechanics, which allows analysis of magneto-mechanical devices by familiar techniques.

Output torque, which depends on the change of co-energy with rotor displacement, is roughly proportional to the co-energy of the active section. The co-energy exists principally in the air gaps between the rotor and stator magnetic sectors and within the sectors themselves. Generally speaking, highly permeable materials possess small co-energizes, resulting in gap co-energies being predominant. Conversely, low permeability materials can cause the major portion of the co-energy to exist within the magnetic sectors, and yield high co-energies per unit excitation power. From the above, it can be seen that both the co-energies per unit volume and per unit excitation power vary with materials and with the geometry of the sectors and air gaps. It follows, then, that performance and optimized designs will similarly vary.

Powdered iron has proved to be a prudent selection for the magnetic sectors in the past, as shown in a co-pending application entitled, "Variable Reluctance Dynamoelectric Machines," by Park French, Ser. No. 651,790 a continuation of application 384,733, now abandoned. In order to suppress eddy currents, the powdered iron particles are coated with an insulating or low conductivity material and mixed with a small quantity of binder. Pieces of the desired shape are then made by pressing the material into appropriately shaped molds under very high pressures. This manufacturing method is very low in cost and provides magnetic sectors which can be operated at flux densities up to approximately 17 kilogauss. When operated at such high flux densities, the pressed powder material drops to low permeability values (approximately 10) and develops substantial magnetic co-energy values. The present invention makes use of individual wires in the sectors whereby higher co-energizes are obtainable as a consequence of operating at higher flux densities.

The wires employed in the sectors, like powdered iron materials, are capable of developing substantial co-energies which enhance the outputs and efficiencies of the reluctance machines. The wire construction does not allow appreciable spreading of the flux inside the sectors, because the finite thickness of the insulation between wires results in a low transverse permeability for the material. As a consequence, co-energy densities are relatively uniform throughout the overlapping regions of the rotor and stator sectors. This uniform development of co-energies is accompanied by a uniform change in machine inductance which tends to hold the flux densities within the most useful range from the co-energy standpoint. When compared to laminated steel sectors in which lateral flux spreading occurs, the wire sectors produce higher powers per unit weight for a given mean flux density than laminated sheet sectors in machines of comparable design.

A further description of the present invention will be made in conjunction with the attached sheets of drawings which illustrate several embodiments of the invention.

Figure 1:
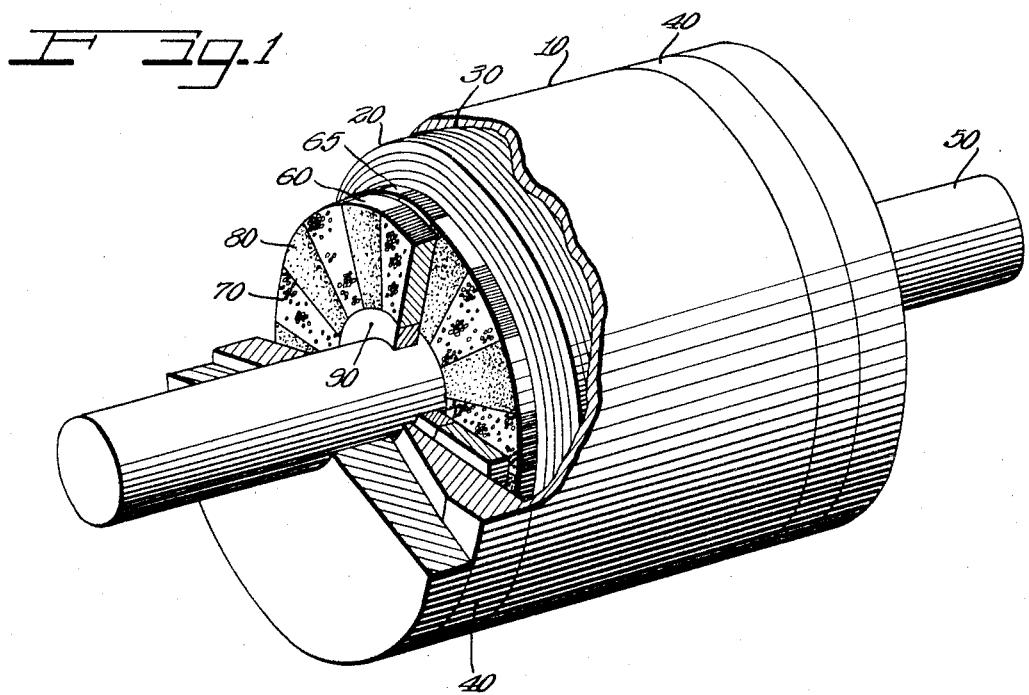
FIGURE 1 is a view in perspective of a dynamoelectric reluctance machine with a portion thereof removed to disclose the disk elements.

In FIGURE 1, a dynamoelectric reluctance machine 10 is shown with a portion thereof removed to more clearly disclose the invention. This figure shows the placing of the major components of the machine, including a centrally disposed shaft 50 which carries an alternating series of rotor disks 60 positioned between axially spaced stator disks 65. A cylindrical flux return section 30 is coaxial with the shaft 50 and forms an outer casing for the dynamoelectric machine. The flux return paths at the ends of the casing are provided by spaced end plates 40 secured to the casing. An axial magnetic field is provided by an excitation coil 20 in circumferential relation to the stator disks 65.

The outside flux return section 30 is composed of a ferromagnetic material having a reasonably high permeability, on the order of at least 50. Both the rotor disks and the stator disks may be identical in magnetic geometry, and consist of alternating equal width sectors 70 of ferromagnetic material, and sectors 80 of non-magnetic material as exemplified in FIGURE 2.

The magnetic sectors are aligned axially with corresponding sectors of all the disks in the rotor set and likewise in the stator set. When the rotor is turned, its magnetic sectors alternately align themselves with the magnetic and non-magnetic portions of the stator. The variation in reluctance to an axial magnetic field created by coil 20 can be made very large by this action.

The operation of the machine can be understood in terms of forces by the tendency of the magnetic sectors 70 of the rotor to align themselves with those of the stator when an axial magnetic field is applied. If the field is applied during the closing phase of the magnetic circuit, the rotor is pulled into alignment with the stator, after which the magnetic circuit is allowed to coast to the open position under low or zero field conditions. This action delivers a rotational force to the rotor, providing motor action. Similarly, applying the field during the opening phase requires a torque input through the rotor shaft, providing generator action.

The coil 20 provides the necessary axial magnetic field. Thus when current passes through the coil 20 from a suitable source of properly phased alternating current (not shown in these drawings), an axial magnetic field is provided, the field encountering a variable reluctance, depending upon the relative position between the rotor disks and the stator disks. The flux return path of the machine extends through the end flux return section 40 and thence through the frame or outside flux return section 30.

Figure 2:
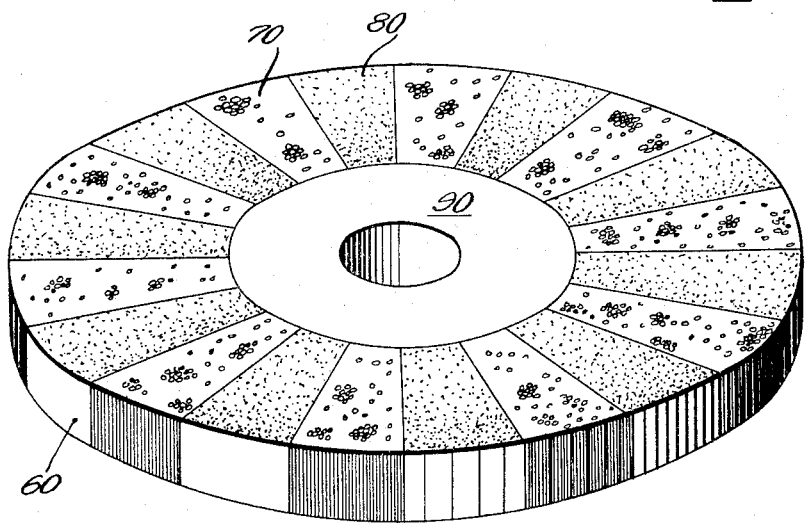
FIGURE 2 is a pictorial view of a disk element in accordance with the invention.

Referring now to FIGURE 2, there is shown one of the improved disk elements of this invention. This disk element 60 is composed of alternating magnetic sectors 70 and non-magnetic sectors 80, each of which is bonded to a central core 90 composed of non-magnetic material.

The magnetic sectors are composed of a group of insulated high magnetic permeability wires which are bound together by a suitable insulating material, such as an epoxy resin.

The wires are drawn to small diameters and insulated from each other to suppress eddy current losses. They are then formed into a bundle with the shape and cross-section of the magnetic sectors and bonded together with an impregnating adhesive. Sections cut from this bundle are magnetic sectors which are then bonded into the rotor and stator disks. As shown in FIGURE 2, the wires extend longitudinally in the direction of the flux.

Figure 3:
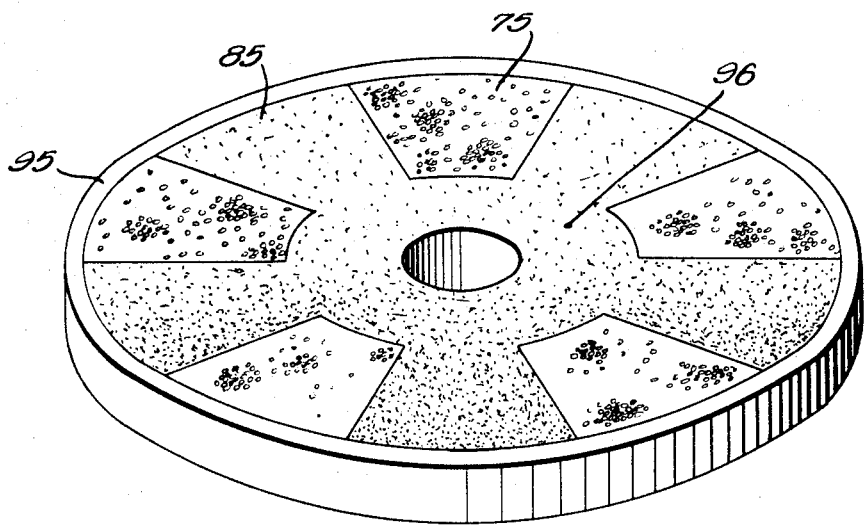
FIGURE 3 is a pictorial view of another modified form of a rotor element.

Referring now to FIGURE 3, another embodiment of the invention is shown, which is another form of stator or rotor disk element. This disk element comprises a diamagnetic, dielectric wheel having a central core 96 and a plurality of sectors 85 extending therefrom, and magnetic sectors 75 interposed between these non-magnetic sectors 85. A rim 95 surrounds the disk to add strength to the structure for high speed operation. The magnetic sectors are bonded into the diamagnetic, dielectric wheel. The wheel can be made from filled or laminated plastics, such as epoxy Fiberglas or of ceramic materials such as high strength alumina. If a rim 95 is required to provide hoop strength, as for high-speed operation, it can be made of either bonded Fiberglas or a thin, non-magnetic metal ribbon. In the latter case, the ribbon should be spirally wound with interlaminar insulation, and care should be taken in securing the ends so that the rim does not constitute a shorted electrical loop. If these insulating measures are not taken, large eddy current losses may result.

In summary, this invention resides in the method and apparatus of providing disk elements for a dynamoelectric reluctance machine, wherein each disk element has a plurality of magnetic and non-magnetic sectors. The magnetic sectors are composed of a plurality of insulated conductors to provide a plurality of magnetic paths of high permeability extending in a parallel direction with respect to the shaft of the machine. This construction provides for a high density field which results in high co-energy densities in the magnetic sectors. Consequently, torque and power outputs are substantially improved.

It should be evident that various modifications can be made to the described embodiments without departing from the scope of the present invention.

I claim as my invention:

1. A dynamoelectric reluctance machine comprising:
a frame,
a shaft mounted on the frame;
a plurality of rotor elements secured in closely spaced relation along said shaft;
a plurality of stator elements extending from said frame in interleaved relation with said stator elements, certain of said elements having a plurality of magnetic sectors and a plurality of non-magnetic sectors, said magnetic sectors each containing a plurality of insulated magnetic flux carriers extending in a parallel direction with respect to said shaft; and
means for generating a dynamic magnetic field extending in a parallel direction with respect to said shaft so that said plurality of magnetic flux carriers transmit said field.

2. A dynamoelectric reluctance machine comprising:
a frame;
a shaft mounted on the frame;
a plurality of rotor elements secured in closely spaced relation along said shaft;
a plurality of stator elements extending from said frame in interleaved relation with said stator elements,
said rotor elements and said stator elements each having a plurality of magnetic sectors and a plurality of non-magnetic sectors,
said magnetic sectors each containing a plurality of insulated discrete magnetic flux carriers extending in a parallel direction with respect to said shaft; and
means for generating a dynamic magnetic field extending in a parallel direction with respect to said shaft so that said field extends through said plurality of magnetic flux carriers.

3. A dynamoelectric reluctance machine comprising:
a frame;
a shaft mounted on the frame;
a plurality of rotor elements secured in closely spaced relation along said shaft;
a plurality of stator elements extending from said frame in interleaved relation with said stator elements,
certain of said elements having a plurality of magnetic sectors and a plurality of non-magnetic sectors, said magnetic sectors each containing a plurality of discrete insulated magnetix flux carriers extending in a parallel direction with respect to said shaft, each of said insulated magnetic flux carriers comprising an insulated high-permeability conductor; and
means for generating a dynamic magnetic field extending in a parallel direction with respect to said shaft so that said plurality of magnetic flux carriers transmit said field.

4. A dynamoelectric reluctance machine comprising:
a frame;
a shaft mounted on the frame;

a plurality of rotor elements secured in closely spaced relation along said shaft;

a plurality of stator elements extending from said frame in interleaved relation with said stator elements, certain of said elements constructed to form a diamagnetic wheel having a plurality of sectors extending from the central portion thereof at regularly spaced intervals and having a plurality of insulated high-permeability conductors bonded to the wheel within said intervals to form a plurality of magnetic paths; and means for generating a dynamic magnetic field extending in a parallel direction with respect to said shaft so that said plurality of magnetic paths transmit said field.

5. In a dynamoelectric reluctance machine having a plurality of disk elements mounted along a shaft and a dynamic magnetic field extending in a parallel direction with respect to said shaft, certain ones of said disk elements comprising:

a core;

a plurality of non-magnetic sectors bonded to the core at regularly spaced intervals; and a plurality of magnetic sectors bonded to said core within said intervals and containing a plurality of insulated magnetic flux carriers extending in a parallel direction with respect to said shaft so that said plurality of magnetic flux carriers transmit said field.

6. In a dynamoelectric reluctance machine having a plurality of disk elements mounted along a shaft and a dynamic magnetic field extending in a parallel direction with respect to said shaft, certain ones of said disk elements comprising:

a core;

a plurality of non-magnetic sectors bonded to the core at regularly spaced intervals; and a plurality of magnetic sectors composed of a plurality of insulated high-permeability conductors bonded to said core within said intervals to provide a plurality of magnetic paths extending in a parallel direction with respect to said shaft so that said plurality of magnetic paths transmit said field.

7. In a dynamoelectric reluctance machine having a plurality of disk elements mounted along a shaft, certain ones of said disk elements comprising:

a diamagnetic wheel having a plurality of sectors extending from the central portion thereof at regularly spaced intervals; and a plurality of magnetic sectors composed of a plurality of insulated high-permeability conductors bonded to the diamagnetic wheel within said intervals to provide a plurality of magnetic paths extending in a parallel direction with respect to said shaft so that said plurality of magnetic paths transmits said field.

8. In a dynamoelectric reluctance machine having a plurality of disk elements mounted along a shaft and means providing a dynamic magnetic field extending in a parallel direction with respect to said shaft, certain ones of said disk elements comprising:

a diamagnetic wheel having a plurality of sectors extending from the central portion thereof at regularly spaced intervals;

a plurality of magnetic sectors composed of a plurality of insulated high-permeability conductor bonded to the diamagnetic wheel within said intervals to provide a plurality of magnetic paths extending in a parallel direction with respect to said shaft so that said plurality of magnetic paths transmits said field; and a non-magnetic rim encircling the wheel to provide additional strength to the wheel for high-speed operation of the machine.

References Cited

UNITED STATES PATENTS

| | | | |
|---|---|---|---|
| 579,012 | 3/1897 | Scheeffer | 310—168 |
| 2,438,629 | 3/1948 | Anderson | 310—268 |
| 3,284,651 | 11/1966 | Wesolowski | 168 |

MILTON O. HIRSHFIELD, *Primary Examiner.*

L. L. SMITH, *Assistant Examiner.*